Figure 2:
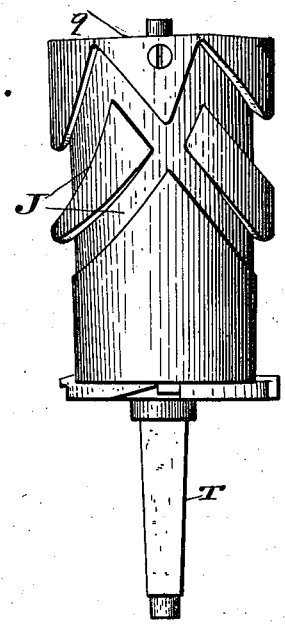

(No Model.) 4 Sheets—Sheet 1.

M. E. GREGG.
MAGAZINE GUN.

No. 374,597. Patented Dec. 13, 1887.

ATTEST.
J. Henry Kaiser
Victor J. Evans.

INVENTOR
Myron E. Gregg
By [signature] atty.

(No Model.) M. E. GREGG. 4 Sheets—Sheet 2.
MAGAZINE GUN.
No. 374,597. Patented Dec. 13, 1887.
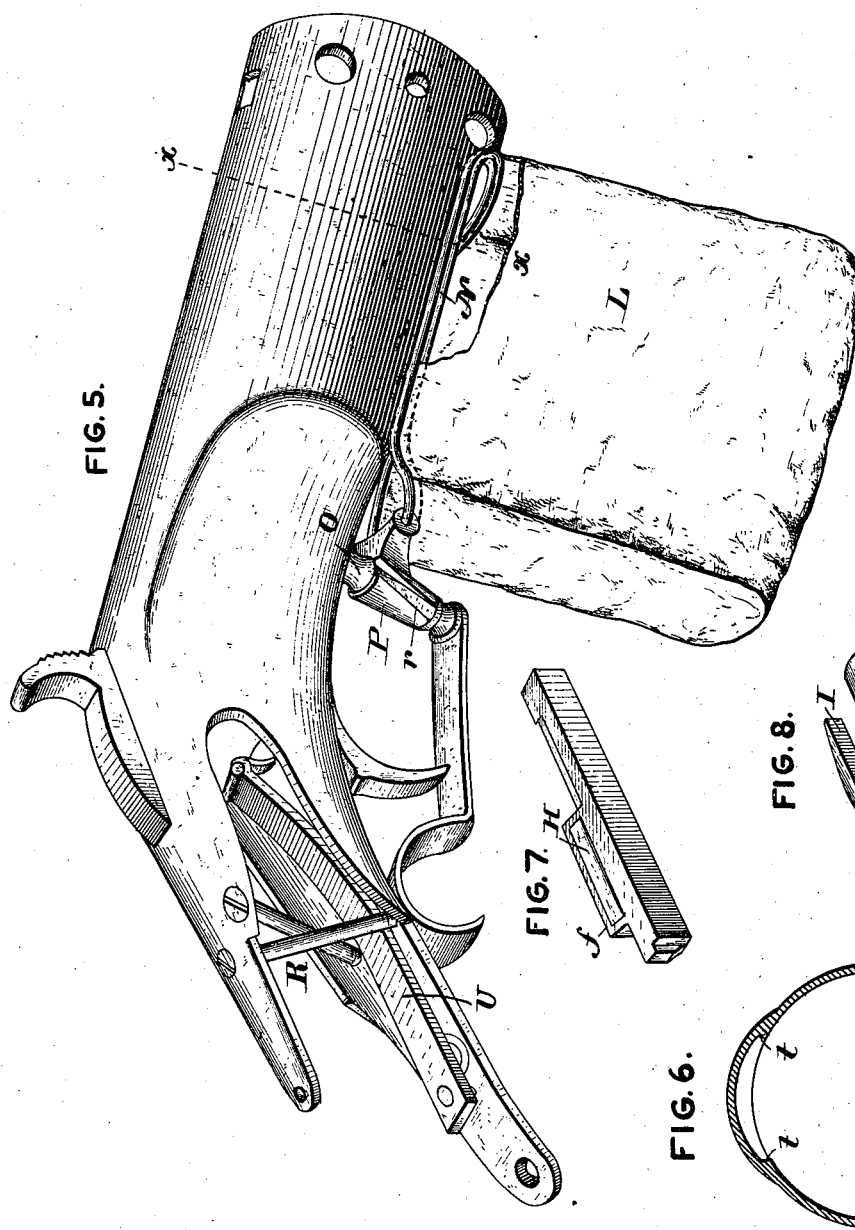
Witnesses
J. Henry Kaiser
Victor J. Evans.
Inventor
Myron E. Gregg
By his Attorney (No Model.) 4 Sheets—Sheet 3.
M. E. GREGG.
MAGAZINE GUN.
No. 374,597. Patented Dec. 13, 1887.
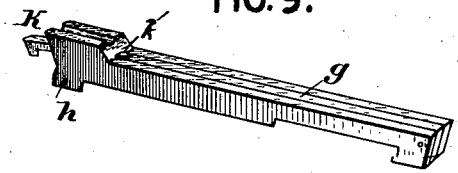
FIG. 9.
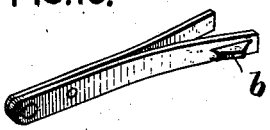
FIG. 10.
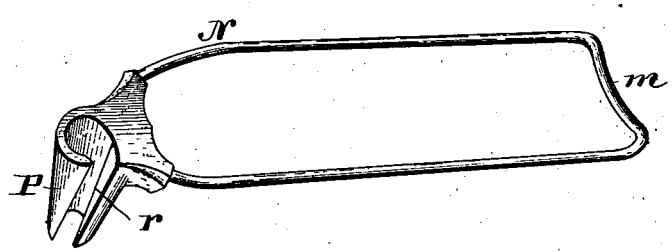
FIG. 11.
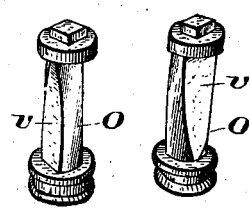
FIG 12.
FIG. 13.
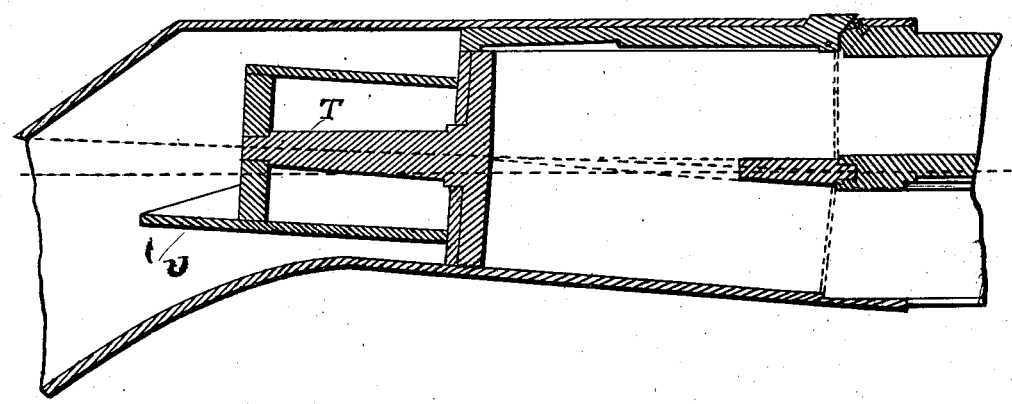
ATTEST.
J. Henry Kaiser.
Victor J. Evans.
INVENTOR.
Myron E. Gregg
By W. J. Johnston
Atty (No Model.)
M. E. GREGG.
MAGAZINE GUN.
No. 374,597. Patented Dec. 13, 1887.
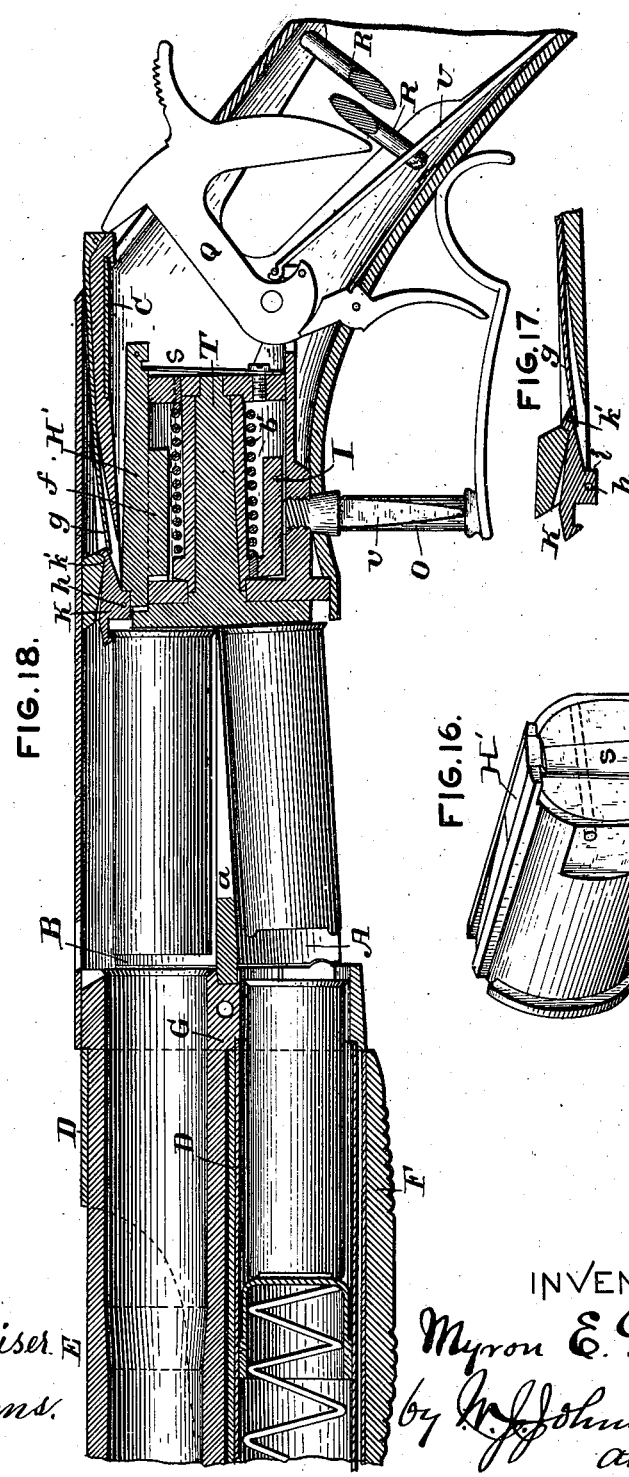
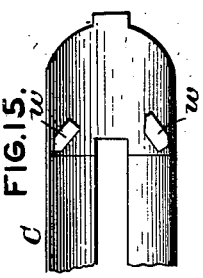
ATTEST.
J. Henry Kaiser.
Victor J. Evans.
INVENTOR.
Myron E. Gregg
by W. J. Johnston
Atty.

UNITED STATES PATENT OFFICE.

MYRON E. GREGG, OF WASHINGTON, DISTRICT OF COLUMBIA.

MAGAZINE-GUN.

SPECIFICATION forming part of Letters Patent No. 374,597, dated December 13, 1887.

Application filed August 1, 1887. Serial No. 215,853. (No model.)

*To all whom it may concern:*

Be it known that I, MYRON E. GREGG, a citizen of the United States, residing at Washington, in the District of Columbia, have invented certain new and useful Improvements in Magazine Guns; and I do hereby declare the following to be a full, clear, and exact description of the invention, such as will enable others skilled in the art to which it appertains to make and use the same.

My invention relates to the class of magazine-guns; and it consists in certain details of construction and arrangement of parts, hereinafter more specifically described in the specification, pointed out in the claims, and illustrated in the drawings, and is intended as an improvement on the device for which Letters Patent No. 353,676, dated December 7, 1886, were heretofore granted to me.

Figure 1:
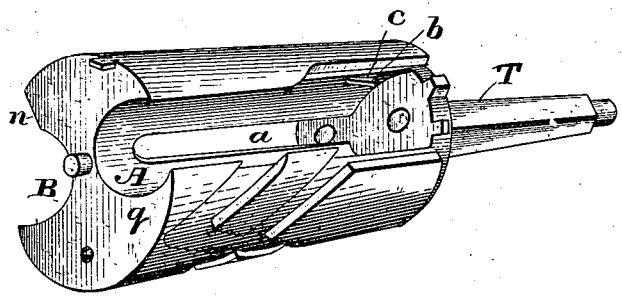
Figure 3:
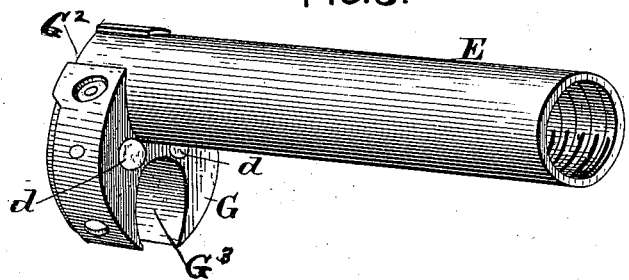
Figure 4:
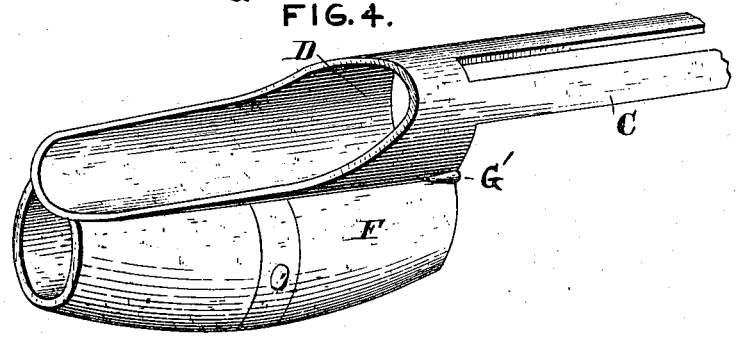

In the drawings, Figure 1 is a perspective view of my oscillating cylinder, showing the recess for receiving and holding the cartridge when it is delivered from the magazine and while being conveyed to its position for delivery into the barrel, also showing an opening in the bottom of said recess communicating with the shell-chamber and a portion of the cam-grooves on its exterior surface. Fig. 2 is a front elevation of the same, showing the form and arrangement of the cam-grooves on the face. Fig. 3 is a perspective view of the rear section of the barrel which forms a guide for the operating-slide, to which the handle is attached. Fig. 4 is a view of the operating slide and handle with the forward portion broken away. Fig. 5 is a view of the outer metallic shell or casing inclosing the operative parts with the shell-retriever attached. Fig. 6 is a vertical cross-section through the line *x x* of Fig. 5. Fig. 7 is a perspective view of the catch-bar designed to fit and move in the longitudinal recess in the top of the spool-barrel, Fig. 16, and provided with a non-metallic cushion or buffer to receive the impact of the spool-stop for the purpose of lessening or deadening the sound. Fig. 8 is a view of the spool, showing a modification in the form of the stop adapting it for contact with the cushion in the catch-bar. Fig. 9 is a detail view of the carrier-arm having the retractor-hook and its spring. Fig. 10 represents a spring designed to fit in a longitudinal recess in the cylinder alongside of the cartridge chamber, and provided with a lug or projection at its end to project through an opening into the cartridge-chamber and serve as a catch for the rim of the cartridge to hold the latter back against the rear wall of the chamber. Fig. 11 represents the frame of the shell-retriever, designed to be removably attached to a stud forming the front portion of the guard, which retriever serves to catch and hold the empty shells as they are ejected from the gun. Fig. 12 represents the guard-stud, of peculiar construction to adapt it to hold the frame of the shell-retriever. Fig. 13 is a longitudinal section showing a portion of the casing with the cylinder in position and the line of its axis as compared with the longitudinal axis of the barrel of the gun, in order that the chamber that is uppermost shall always be in line with the barrel. Fig. 14 is a view of the inner end of the operating-slide represented in Fig. 4. Fig. 15 is a reversed view showing the under side of the same and the arrangement of the cam pins or studs. Fig. 16 is a perspective view of the spool-barrel, showing the catch-bar in the slot in its upper surface, its actuating-spring, and a rear extension provided with a slot or recess forming a guide for the lower end of the hammer. Fig. 17 is a detail showing a longitudinal vertical section of the carrier-arm, with the retractor-hook and its actuating-spring. Fig. 18 is a longitudinal vertical section of the gun assembled, showing its various parts in position at the instant when an empty shell has been withdrawn from the barrel and a cartridge deposited in the cartridge-chamber from the magazine.

Referring more particularly to the drawings, A, Figs. 1 and 18, is the recess, which receives the cartridge from the magazine and conveys it to the rear of the barrel, and B is the recess or chamber in which the empty shell is received from the barrel and conveyed to the opening at the under side of the casing, where it is ejected.

*a* is an opening of convenient size through the bottom of both the shell and cartridge chambers, by which they are made communicating, and serves to admit light at the rear end of the barrel when empty, whereby it may be readily inspected, oiled, and cleaned. It will be observed that the shell and cartridge chambers are not parallel with each other, but are made to converge at the rear end to correspond with the conical shape of the cylinder, so that the rims of the empty shell and the cartridge are brought near together, as shown in Fig. 18, and in order that the chamber which is uppermost shall always occupy a position in-line with the barrel I incline the axis of the cylinder by placing the rear pivot slightly above the center, as shown in Fig. 13, Sheet 3, thereby inclining the lower chamber, while the upper is always on a line with the barrel. By this construction I am enabled to lessen both the size and weight without reducing the capacity or efficiency of my gun. It has also been found desirable to hold the butt of the cartridge against the rear wall of the cartridge-chamber. Especially is this the case when short cartridges are used that do not fill the chamber. This I accomplish by means of the spring shown in Fig. 10, which occupies a longitudinal recess alongside of the cartridge-chamber and is provided at its rear end with a lug, $b$, of suitable construction, which projects through a slot, $c$, into the cartridge-chamber and serves as a catch to hold the rim of the cartridge, which readily passes back over the lug by the force of the magazine-spring.

The operation of my cylinder does not differ from my former patent and has already been fully described therein. The construction of the operating-slide C (shown in Fig. 4) differs, however, from my former patent, in that its forward or handle end, D, is made tubular and incloses the rear end, E, of the barrel, which forms its guide, thereby enabling me to dispense with the guide-rods formerly employed.

The handle F is secured to the tubular portion of the slide and surrounds or incloses the magazine, as shown by dotted lines, Fig. 18, Sheet 4.

In shotguns I prefer to make that portion of the rear end of the barrel which forms the guide E for the slide separately or auxiliary, as shown in Fig. 3, in order to obtain the requisite thickness of barrel; but in rifle-barrels, which are of sufficient thickness at their base, I prefer to make the guide portion E integral with the barrel by turning down or cutting away sufficiently to enable it to pass within the tubular portion D of the slide. The enlarged portion G at the base of the barrel may be made integral with the barrel, as shown in Fig. 3, or a separate piece provided with an interiorly-threaded opening for the end of the barrel. Upon the outer or front face of this block I provide two non-metallic cushions or buffers, $d\ d$, to receive the impact of the slide and deaden sound. These cushions are inserted within the block G on each side close beneath the barrel and between it and the magazine and are flush with the face of the block. Upon the inner tubular end of the slide are provided corresponding lugs, $G'$, which impinge against these cushions when the slide is drawn back. This piece G is provided on either side at the top of the barrel with recesses $G^2$, which serve as ways or guides for the prongs of the slide C. It is also provided beneath the barrel with an opening, $G^3$, communicating with the mouth of the magazine.

The catch-bar shown in Fig. 7 does not differ materially from that shown and described in my former Letters Patent, except that a longitudinal projection, $f$, is provided on its under side, containing on one side a recess, within which is inserted a non-metallic cushion, H, similar to those before described in the block at the base of the barrel, and for the same purpose—viz., to lessen or deaden the sound occasioned by the impact of the spool shoulder or stop I, Fig. 8. The spool is provided with a rearward extension, I, outside of its surrounding coiled actuating-spring, as shown in Figs. 8 and 18, formed integral with the semicircular flange on the front end of the spool, which impinges against the cushion H of the catch-bar when the cylinder is tripped.

The carrier-arm shown in Fig. 9 differs from the construction shown in my former Letters Patent only in having the spring $g$ heavier and longer within a longitudinal recess in the arm, and secured at the rear or outer end, with its front end bearing against the under side of the rear end of the retractor-hook K back of its pivot $h$, as shown in Figs. 9, 17, and 18. By this construction better results are obtained, as the tendency of the point of the hook is now downward, owing to the position of its pivot $h$, being limited in said downward movement by the upward projection $k'$ on the rear end of said hook engaging with the roof of the slot in the arm.

The shell-retriever L, Fig. 5, consists of a bag or receptacle of canvas, netting, or other suitable material suspended beneath the shell-opening in the casing to a frame, N, (shown in Fig. 11,) and is designed to receive the empty shells as they are discharged from the gun. This opening in the casing is not exactly beneath the center, but slightly at one side, to enable the shell to be readily discharged in the direction that the cylinder rotates, and consequently the plane of its sides is oblique to the vertical axis of the casing. The stud O is set at right angles with the plane of this opening, and its opposite sides are so filed or cut away as to present the appearance of a flat post set at right angles with the horizontal plane of the casing, it being cut away at the top at one side and on the opposite side at the bottom, as shown in Figs. 12 and 18.

The frame N is nearly rectangular in shape, and is designed to surround the opening on the under side of the casing when in position. It is removably pivoted to the post or stud O of the guard by means of a thimble, P, at its end, which thimble is provided with an oblique or inclined longitudinal opening, $r$, on one side corresponding in width to the short diameter of the stud, so that it may be passed upon the stud by turning it to a position that will bring the slot opposite the short side. When desired to adjust the frame to the gun, it is placed at right angles with the gun on the right-hand side, so that the slot in the thimble is brought opposite the short or narrow side of the stud and passed upon it, then turned forward to a line with the gun, bringing the slot r opposite the wide or flat side v, with the receptacle in position to receive the empty shells, as in Fig. 5. The periphery of the stud being equal to the interior of the thimble, the frame revolves upon the stud as a pivot upon the plane of the opening in the casing and corresponding with the inclination of the stud O, its pivot. The outer end, m, of the frame is bent or concave to correspond with the convexity of the casing, so that when adjusted and turned to its normal position beneath the opening it will tightly clasp the casing.

When it is desired to replenish the magazine, the shell-retrieving attachment may be turned to the left-hand side out of the way and cannot become accidentally detached, as the inclination of the stud and that of the slot r in the thimble are now at opposite angles. When desired to detach and remove it from the gun, however, it is turned back to its first position at right angles on the right-hand side, when the slot r comes in line with the narrow side of the stud, their angles being the same, and it is readily slipped off and removed.

I have found it desirable to change the form and arrangement of the cam-grooves on the face of my cylinder somewhat from that shown in my former Letters Patent, and also the position of the studs or cam-pins w on the under side of the operating-slide, Fig. 15, and instead of placing one pin forward or in advance of the other and a corresponding arrangement of the grooves, in order to secure at all times a bearing-surface for one of the pins while the other is passing the open space at the intersections or crossing of the grooves and the cartridge or shell chambers, I now place the cam-pins on the same line and arrange the cam-grooves to correspond, and in order to secure at all times a bearing-surface I form the pins rectangular in shape, with the corners slightly beveled, and place them at right angles with each other. I also form one portion of each cam-groove from its angle outward sufficiently wide to receive the long side of the cam-pin, while its opposite arm is only of sufficient width to receive the short side or end of the pin, this arrangement being reversed in the opposite grooves to accommodate the right-angled position occupied by the pins with relation to each other. By means of this arrangement the long side of the cam-pin is presented at the intersection of the narrow part of the groove and bridges it, affording at all times a bearing-surface for the pin.

I have found that by curving one arm of each of the cam-grooves, as shown at J, Fig. 2, for the inward thrust of the slide, a considerable amount of friction is avoided upon the cam-pin and the slide in its backward motion encounters less resistance in starting.

The rapid rotation of the cylinder imparts to the discharged cartridge-shell a centrifugal impetus in the direction of its rotation. Consequently the opening of the shell-chamber on that side is required to incline or slope in that direction sufficiently to at all times effectively expel the empty shell and prevent its being caught and pinched between the edge of the chamber and that of the casing. In order to still more perfectly accomplish this I have cut away or beveled the point or edge of the chamber, as shown at n, Fig. 1, which, while it does not interfere with the perfect closing of the opening in the casing when the cylinder is in position for firing, affords a wide exit for the shell and prevents it from being caught by the rapid return movement of the cylinder as the breech is closed.

It is found in my former construction that the effect of firing is to force the head of the shell back against the cylinder, which operates as a breech-block, and the friction caused thereby somewhat impedes the easy revolution of the cylinder. In order to overcome this I have formed a slight incline, q, Figs. 1 and 2, on the forward end of the cylinder in the rear of the cartridge when in the firing position, so that the continued rotation of the cylinder immediately after firing causes the surfaces to separate, frees the head of the cartridge, and avoids friction.

In guns of ordinary construction the casing is usually secured to the stock by means of a screw inserted through the ends of the tangs, and in order to secure the required strength and rigidity the tangs are necessarily of thick or heavy metal, which proportionately increases the weight of the gun. This I obviate by means of two intermediate screws, R, Figs. 5 and 18, situated at an intermediate point between the ends of the tangs and the hammer, and in order to avoid the mainspring they are placed crosswise in the form of an X, so that they enter the metal casing on each side of the mainspring and cross above it, thoroughly stiffening and firmly binding together the casing and stock of the gun, and enabling the casing to be formed throughout of light metal tubing of uniform thickness. I also dispense with the downward-projecting longitudinal ribs secured to the top of the casing (shown in my former patent) and serving as guides for the operating-slide, and instead thereof provide shoulders t t on each side, Fig. 6, which serve as guides for the slide.

Having described the various parts of my gun in detail, I will now proceed to describe its operation when the parts are assembled in their proper positions, as shown in Fig. 18, with a cartridge in its chamber in the cylinder just received from the magazine and an empty shell in the shell-chamber just withdrawn from the barrel. At this point the slide C (the rear end of which engages with the under side of the carrier-arm, as in my former patent) has forced said arm back, and with it the hammer Q, to a position of full-cock, the retractor-hook K in the front end of the arm has seized and withdrawn the empty shell from the barrel, and the shoulder $i$ on the front under side of the arm is in contact with the front end of the catch-bar H', (shown in Figs. 7 and 18,) which rests and moves in the slot in the top of the spool-barrel, Fig. 16, and is, when in its normal position, held by the spring $s$ in the slots or recesses in the rear end of the cylinder and serves as a stop to hold the latter in its firing and tripping positions. The continued backward movement of the slide C forces back the catch-bar H' through the medium of the carrier-arm and releases the cylinder, which (by the force of the spring $b'$, surrounding the spool, Fig. 18, which receives the shank T of the cylinder and is located within the spool-barrel) causes the cylinder to rotate until the stop I of the spool impinges against the cushion H of the catch-bar, and the empty shell is ejected through the opening in the bottom of the casing and the loaded shell carried to the rear of the barrel, into which it is instantly forced through the medium of the carrier-arm by a forward movement of the slide C, and the continued forward thrust of the slide by means of the cam-pins $w$, operating in the grooves on the face of the cylinder, serves to reverse the motion of the cylinder and close the breech of the gun.

The spool-barrel is provided with a rearward projection, U, on its under side, Figs. 13 and 16, which projection has an opening or slot, $u$, that serves as a guide for the lower end of hammer Q.

Having thus described my invention, what I claim, and desire to secure by Letters Patent, is—

1. In a magazine gun operated by a movable handle secured to an actuating-slide, the combination of an oscillating carrier-cylinder, a reciprocating slide adapted to oscillate said cylinder, having its front end tubular to surround and inclose the base of the barrel, and the guide, consisting of the rear portion of the barrel, reduced to adapt it to pass within the tubular portion of the slide, substantially as described.

2. In a magazine-gun, the combination of the conical oscillating cartridge-cylinder located in rear of the barrel, the tripping mechanism consisting of the spring-surrounded spool inclosing the shank of the cylinder and located within the spool-barrel and the catch-bar sliding in a longitudinal slot in the spool-barrel, the casing surrounding and inclosing the cylinder and tripping mechanism, and the slide adapted to rotate the cylinder by means of studs on the under side of its rear end engaging with cam-grooves on the face of the cylinder, and also adapted to force back the catch-bar from contact with the cylinder, substantially as described.

3. In a magazine-gun provided with an oscillating carrier-cylinder and an actuating-slide, the combination of the cylinder having a communicating opening through the bottom of the cartridge and shell chambers, the barrel, and the actuating-slide, whereby light may be admitted at the bottom or base of the barrel, substantially as specified.

4. In a magazine-gun, the conical oscillating cartridge-cylinder having the cartridge and shell chambers arranged to diverge toward the larger end of the cylinder and an opening through their bottom, whereby they are made communicating, in combination with the operating-slide, the barrel, and the casing, substantially as specified.

5. In a magazine-gun, the conical oscillating cylinder provided with the rearward converging chambers and pivoted on a slightly-inclined axis, whereby its uppermost chamber is always in line with the barrel, in combination with the actuating slide, the casing, and the barrel, substantially as specified.

6. In a magazine-gun, the combination of the conical oscillating cylinder provided with the diverging chambers connected by an opening through their bottom and pivoted upon an inclined axis, as described, with the casing made to conform to the conical shape of the cylinder, and the actuating-slide having its forward tubular end inclosing the base of the barrel as a guide, substantially as described.

7. The combination, in a magazine-gun, of the cylinder having the angular cam-grooves on its face, one arm of each groove being made wider than the other, and this arrangement reversed in the opposite grooves, with the operating-slide having its outer and tubular end inclosing the base of the barrel as a guide, and provided with rectangular cam pins or studs on its inner end, arranged at right angles with each other, and adapted to fit within the cam-grooves, substantially as specified.

8. In a magazine-gun provided with an oscillating cylinder and constructed substantially as herein described, the spring arranged in a longitudinal recess alongside of the cartridge-chamber and provided with a lug projecting through an opening at the rear of the chamber, in combination with the cylinder whereby the head of the cartridge is held against the rear wall of the chamber until forced into the barrel by the carrier-arm, substantially as specified.

9. In a magazine-gun constructed substantially as described, the combination of the actuating-slide, the tripping mechanism, and the oscillating cylinder having on its front face a slight incline, whereby the head of the shell will be freed from contact with the cylinder by its forward movement after firing and friction prevented, substantially as specified.

10. In a magazine-gun constructed substantially as herein described, the combination of the actuating-slide, the tripping mechanism, the casing, and the oscillating cylinder provided with the communicating cartridge and shell chambers, and having the edge of the shell-chamber beveled or cut away, whereby the shell is readily discharged and prevented from being caught between the edges of the chamber and of the opening in the casing by the rapid return movement of the cylinder in closing the breech, substantially as specified.

11. In a magazine-gun, the combination of the actuating-slide having the tubular front portion adapted to inclose the base of the barrel, the oscillating cylinder and its tripping mechanism, the inclosing casing, and the separable rear portion of the barrel adapted to serve as a guide for the actuating-slide, all arranged substantially as and for the purpose specified.

12. In combination with the metallic casing of a breech-loader or other gun, the screws R, passing through the tangs in an oblique direction from opposite sides in the form of an X, astride of the mainspring at a point intermediate between the ends of the tangs and the hammer, whereby the stock may be firmly and rigidly secured to the casing at such intermediate point without interfering with the mainspring, substantially as specified.

13. In combination with the base of the barrel of a magazine-gun adapted to be operated by a slide, the non-metallic cushions or buffers to receive the impact of the slide in its backward motion and deaden sound, substantially as specified.

14. In combination with the catch-bar of a magazine-gun constructed substantially as herein described, the non-metallic cushion H, inserted in a suitable recess in its side and intended to receive the impact of the stop on the spring-surrounded spool when the cylinder is tripped, substantially as specified.

15. In a magazine-gun constructed substantially as described, the combination, with the spool, of its rearwardly-projecting stop I, adapted to impinge against the non-metallic cushion in the catch-bar, substantially as specified.

16. In a magazine-gun, the casing inclosing the cartridge-cylinder and its operating mechanism, provided with the interior shoulders or guides, $t\ t$, in combination with the actuating-slide, the inner end of which passes within the casing and is guided and upheld by said shoulders and lateral motion prevented, substantially as described.

17. In a magazine-gun, the shell-retriever removably attached to the stud forming the front of the guard and adapted to revolve thereon, in combination with the breech-casing provided with the shell-opening, whereby the shell-opening registers with the mouth of the retriever when the latter is in position, substantially as specified.

18. In a magazine-gun, the combination of the breech-casing having the shell-opening beneath slightly at one side, the stud O, forming the front of the guard and set at right angles with the plane of the opening, and the rectangular frame designed to support the shell-receptacle and having at its rear end a thimble to fit upon stud O and allow the frame to be turned from side to side on the plane of the opening in the casing, substantially as specified.

19. In a magazine-gun, the combination of the casing provided with the shell-opening beneath and slightly to one side, the stud O, set at right angles with this opening, its sides flattened or cut away, and the retriever-frame thimble provided with an oblique slot or opening corresponding in width with the narrow side of the stud, whereby the thimble may be passed upon the stud by bringing its slot in line with the narrow side thereof on the right only and cannot be detached when turned to any other position, substantially as specified.

20. The combination, in the carrier-arm of a magazine-gun constructed substantially as described, of the spring within the longitudinal recess, pivoted at its rear end, its front end bearing upward against the rear end of the retractor-hook, and the retractor-hook pivoted in the front end of the arm at a point forward of and below its center, substantially as specified.

21. In combination with a magazine-gun having a shell-opening on the under side of its casing, the rectangular retriever-frame removably secured to a pivot at one end, adapted to rotate on the plane of said opening, and having at its outer end a bend to conform to the convexity of the casing, substantially as specified.

22. In a magazine-gun constructed as described, the combination of the operating-slide having the cam-studs on the under side of its rear end, with the oscillating cylinder provided with the cam-grooves on its face, one arm of each groove being curved in order to lessen the friction when starting the rotation of the cylinder, substantially as shown.

23. In a magazine-gun constructed as described, the combination, with the hammer, of the spool-barrel provided with the slotted rearward extension forming a guide for the lower end of the hammer, substantially as specified.

In testimony whereof I affix my signature in presence of two witnesses.

MYRON E. GREGG.

Witnesses:
EDWD. J. UNDERWOOD,
N. B. LOVEJOY.